Sept. 8, 1953      W. F. ALLER      2,651,412
SIZE GAUGING DEVICE
Filed June 30, 1949      4 Sheets-Sheet 1
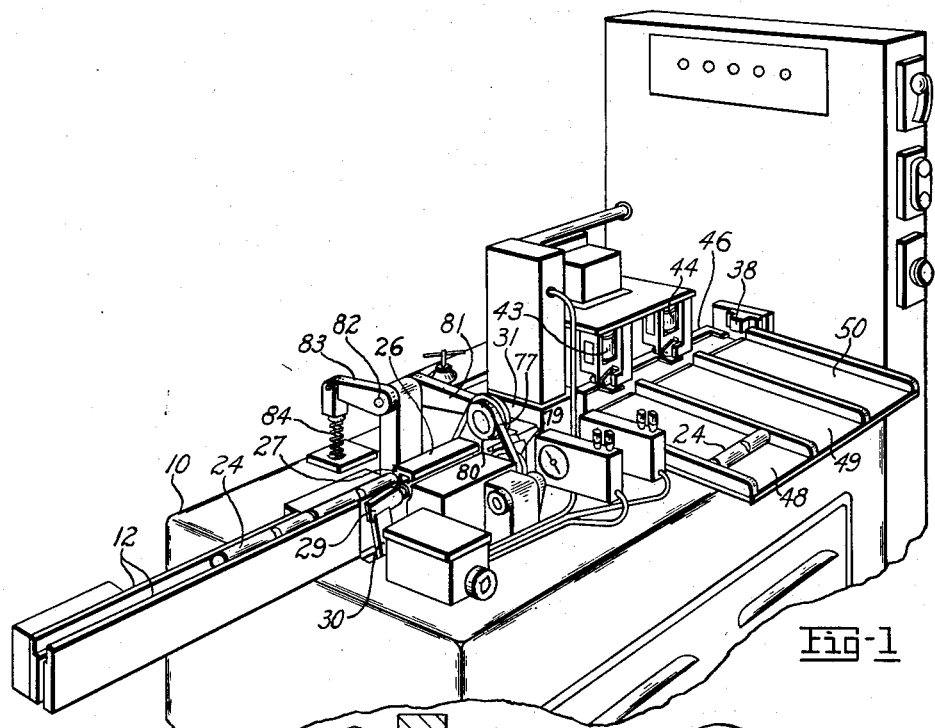
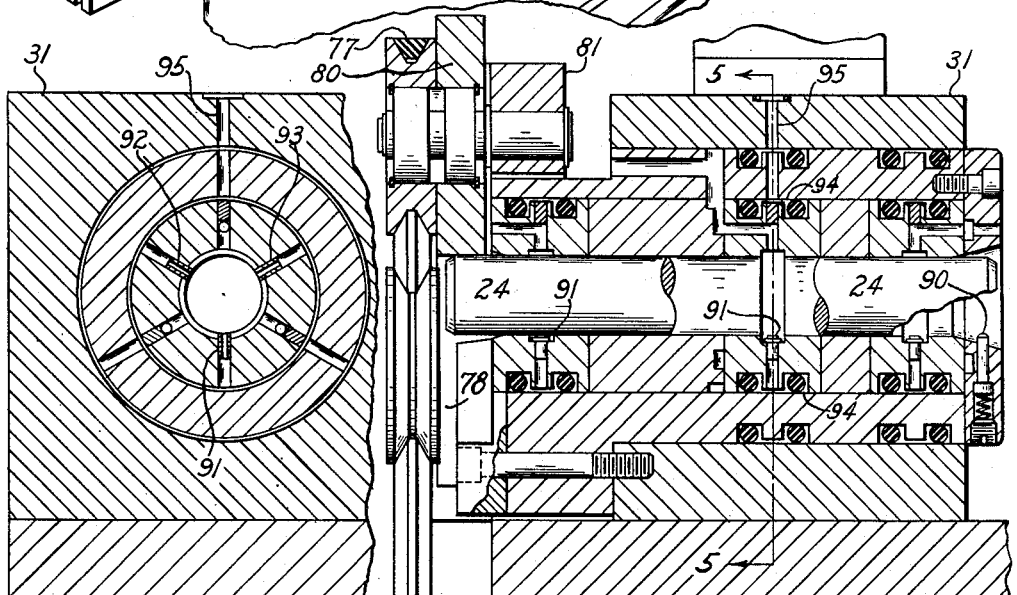
INVENTOR.
W. F. Aller
BY Edward J. Noe Jr.
atty.

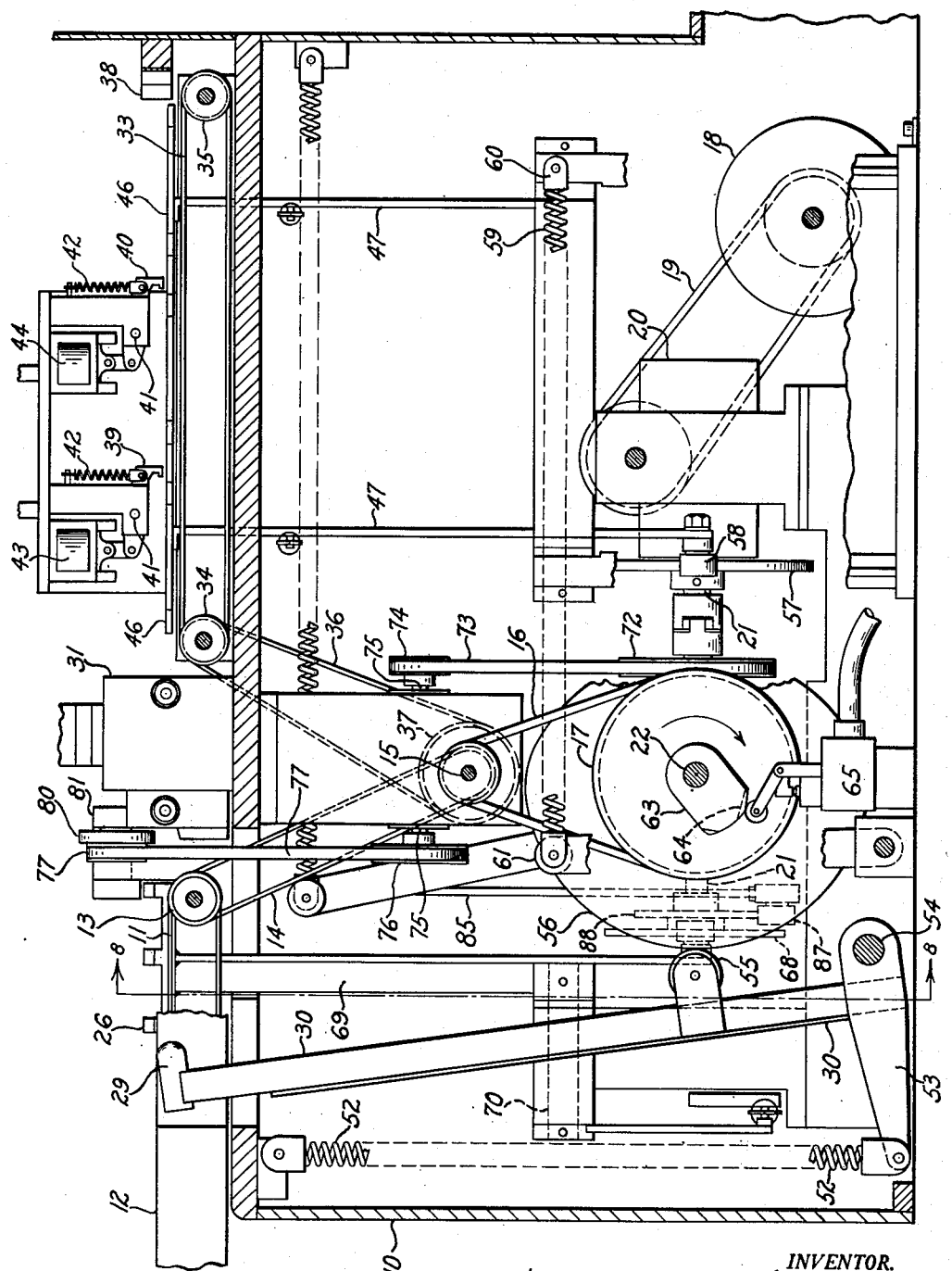

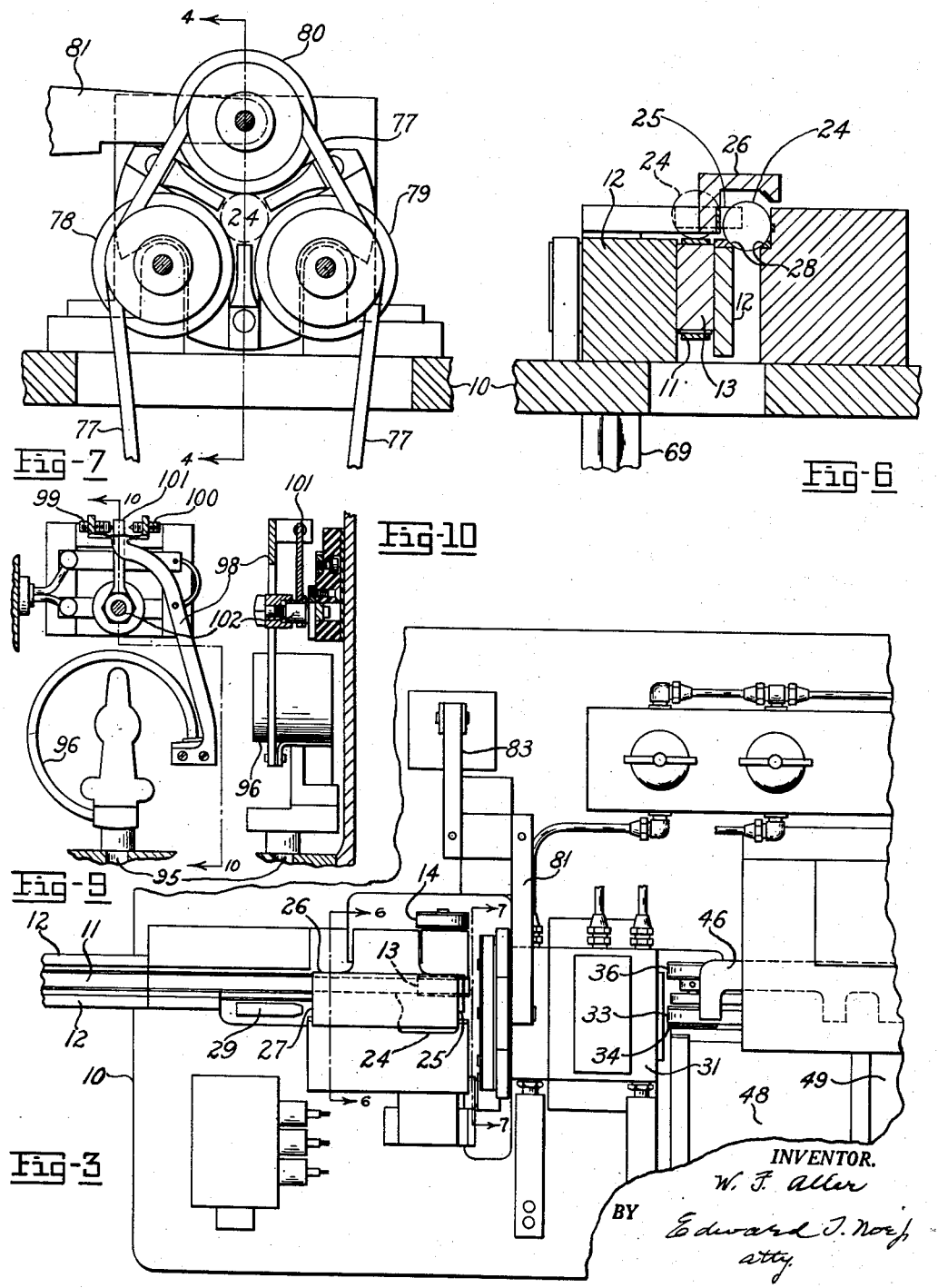

Sept. 8, 1953     W. F. ALLER     2,651,412
SIZE GAUGING DEVICE
Filed June 30, 1949     4 Sheets-Sheet 4
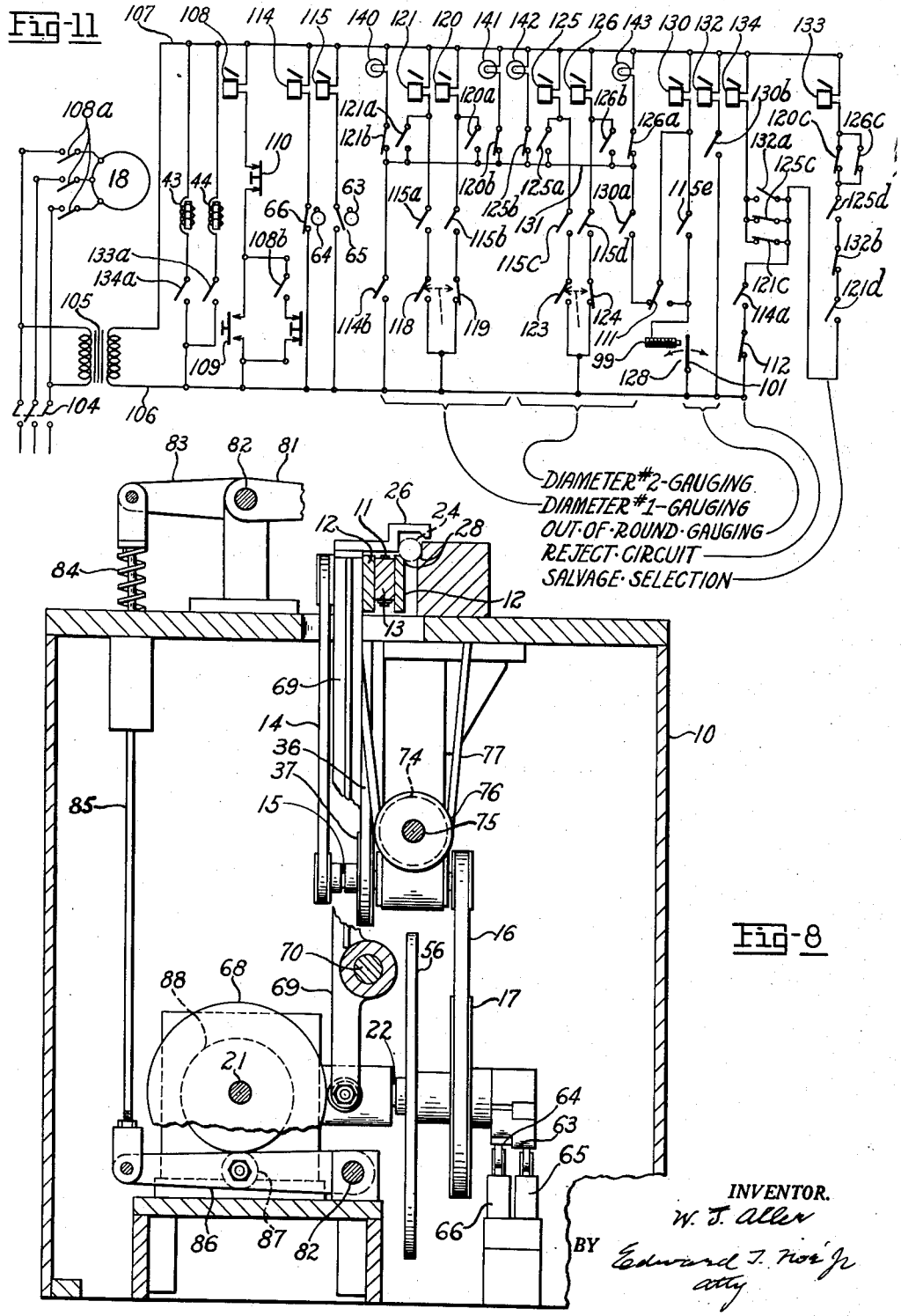
INVENTOR.
W. F. Aller
BY Edward T. Noe Jr.
atty Patented Sept. 8, 1953

2,651,412

UNITED STATES PATENT OFFICE 2,651,412

SIZE GAUGING DEVICE

Willis Fay Aller, Dayton, Ohio, assignor to The Sheffield Corporation, Dayton, Ohio, a corporation of Ohio Application June 30, 1949, Serial No. 102,320

8 Claims. (Cl. 209—82)

This invention relates to gauging apparatus and more particularly to gauging apparatus adapted to gauge and select articles in accordance with a dimension or dimensions.

In accordance with the present invention articles of generally cylindrical form such as king pins and the like are automatically supplied one at a time to a gauging station. At the gauging station the articles are rotatably received in a gauging head and are automatically rotated a part of a revolution to condition an out-of-round gauging apparatus responsive to an out-of-round condition. After this conditioning operation takes place, a gauging and selecting circuit is energized so that the continued rotation of the work, about its own axis, will automatically operate the selecting apparatus depending upon whether or not the workpiece is of the required roundness. At the same time out of roundness is being determined, the diameter of the workpiece is gauged at one or more points along its length and the selecting apparatus is automatically controlled in accordance with the response obtained in the diameter gauging operation. As another workpiece is supplied, the gauged workpiece is moved along from the gauging head and is conveyed to a selected station so that acceptable and non-acceptable parts will be segregated from one another.

It is therefore an object of the invention to provide a gauging apparatus having means for automatically conditioning an out-of-round gauging apparatus and for effecting an automatic control in accordance with the roundness of the articles.

Another object is the provision of a gauging apparatus of the character mentioned in which the articles are supplied automatically by means of a conveyor arrangement to a position adjacent the supply location from which the articles are moved out of the conveyor line of advance and then fed forwardly into the gauging head.

Another object is the provision of a gauging apparatus having means for automatically segregating gauged articles in accordance with out of roundness, oversize diameter, and acceptable roundness and diameters.

Additional objects and advantages of the invention will be apparent from the following description, the appended claims, and the accompanying drawings, in which Fig. 1 is a perspective view of a gauging apparatus embodying the present invention;

Fig. 2 is a side elevation of the gauging apparatus with some of the parts broken away or sectioned for purpose of illustration;

Fig. 3 is a top plan view of a portion of the gauging apparatus including the gauging station;

Fig. 4 is a vertical sectional view taken longitudinally through the gauging head on the line 4—4 of Fig. 7;

Fig. 5 is a vertical section on the line 5—5 of Fig. 4;

Fig. 6 is a section on the line 6—6 of Fig. 3;

Fig. 7 is a vertical section on the line 7—7 of Fig. 3;

Fig. 8 is a section on the line 8—8 of Fig. 2;

Fig. 9 is a front elevation showing the operating parts of the out-of-round gauge;

Fig. 10 is a section on the line 10—10 of Fig. 9; and

Fig. 11 is a diagrammatic illustration of the electrical connections.

Referring more particularly to the drawing in which the same reference numerals are used in the various views to designate like parts, the gauging apparatus as herein shown comprises a frame or base 10 the lower portion of which contains driving and operating devices while the upper portion provides a support for the feeding means, the supply means, and for the gauging and segregating devices. In the particular form of construction illustrated, the gauging apparatus is designed to gauge the diameter of parts such as a king pin for example and for gauging the out-of-round condition of the parts to see whether they satisfy the required tolerance conditions, the pins being selected in accordance with the gauging results into three different groups. Parts that fall within the maximum and minimum diameter tolerances and within the required roundness, are arranged in one group. Parts that are too much out of round or that are undersize and thus not reclaimable are arranged in a second group, while parts that are too large in diameter but which satisfy the roundness requirement and are thus reclaimable are arranged in the third group.

The parts to be gauged are placed by the operator on a feed belt or conveyor 11 arranged between side rails 12. Each end of the conveyor travels over a pulley 13 which is continuously driven by means of a belt 14 operated from another pulley on a drive shaft 15 driven through belt 16 from a pulley wheel 17. An electric motor 18 operates through drive belt 19, and suitable driving mechanism including gear box 20 and drive shaft 21 to turn the shaft 22 on which the pulley 17 is fixed.

The conveyor 11 advances the article 24 until the first piece in the line is stopped by an abutment 25. At the proper time in the cycle of operation the first article in the line is moved laterally out of the line of advance by means of a shifter 26 which is moved to the position shown in Figs. 3 and 6 to take one article at a time and move it over into a position in line with the gauging station. The length of this shifter is slightly less than the length of the article so that only one of the articles will be moved off the conveyor 11 and the next article on the conveyor will then come up against the flat end 27 of the advanced shifter and be held against further advance, riding on the continuously moving conveyor 11 which continues to urge the article forwardly only by frictional engagement.

When the article is moved off the conveyor 11 by the shifter it is pushed laterally onto guide tracks 28 and a push bar 29 carried by lever 30 (see Fig. 2) is then moved axially so as to push the article into the gauging head 31. The push bar 29 is then returned and the shifter 26 returned and another article can then move up against the stop 25 by the action of the conveyor 11.

After a gauging operation takes place with the article in the gauging station, as will be presently described, another article is moved by the action of the shifter 26 and the feed bar 29 into the gauging station, pushing the gauged article out of the gauging station and onto a conveyor belt 33 which is carried on pulleys 34 and 35. The belt is driven through a drive belt 36 through a pulley wheel 37 on shaft 15, the belt 33 operating at considerably greater linear speed than the feed belt 11 which advances the articles to a position adjacent the gauging station. The articles on the belt 33 travel up to the stop 38 if they are of acceptable size and roundness. If they are not of acceptable size and roundness they will be stopped before reaching the abutment 38 by means of one of the stops 39 and 40 pivotally mounted at 41 and movable downward against the action of tension springs 42 under the control of relays 43 and 44. At the proper time in the cycle of operations following the advance of each gauged article from the gauging station, the article on the conveyor belt 33 is pushed laterally from the belt by means of the shift bar 46 carried at the upper ends of pivoted arms 47 so that the article can roll down one of the three inclined troughs 48, 49 and 50, shown in Fig. 1, and thus be segregated into different groups in accordance with the results of the gauging apparatus.

The lever 30 is moved forwardly by means of a spring 52 fashioned to an arm 53 which is fixed to the lever 30 and pivotally mounted on a shaft 54. The cam operated roller 55 carried by lever 30 engages a cam 56 which is mounted on the shaft 22 and continuously driven by the motor 18. The shift bar 46 is timed with the movements of the lever 30 as it is driven from a cam 57 on the motor driven shaft 21, cam 57 engaging a cam roller 58 on one of the arms 47 of the shift bar. A tension spring 59 fastened to a suitable support at 60 holds a tension roller 61 against the belt 16 to maintain a proper driving tension on the belt. On the shaft 22 are switch operating cams 63 and 64 which control limit switches 65 and 66 which time the start and stop of the gauging operation and hold selected solenoids for a predetermined time. The shaft 21 also operates a cam 68 to drive a lever 69 pivotally mounted on a shaft 70, the upper end of the lever 69 carrying the shifter 26, see Figures 2 and 8.

On the shaft 21 is a pulley wheel 72 driving a belt 73 that extends to a pulley wheel 74 on shaft 75. Another pulley wheel 76 on the shaft 75 operates a drive belt 77 (see Figs. 2, 4 and 7) and this belt 77 extends over three pulleys which are fixed respectively to three drive wheels 78, 79 and 80. The drive wheels 78, 79 are mounted for rotation on the end wall of the gauging head 31 to rotate on fixed axes and are so arranged as to contact lower portions of the rear end of an article in the gauging station, while the upper drive wheel 80 is carried on the end of a lever arm 81 and is normally raised out of contact with the article although the arm 81 can be lowered at the proper time in the sequence of operations so as to bring the wheel 80 into contact with the top of the article after the article is in place in the gauging station and cooperate with the drive rollers 78 and 79 in gripping the article to cause its rotation through a predetermined part of a revolution. Fixed to the lever 81 which is pivotably mounted on a shaft 82 is an arm 83 as shown in Figs. 1, 3 and 8. The arm 83 is moved upwardly by a spring 84 and is pulled downwardly at times by a rod 85 connected to a lever 86 having a pulley wheel 87 that engages a cam 88 driven by the motor. The cam 88 periodically at a predetermined time in the cycle moves the rod 85 downwardly and raises roller 80 from the article, but during the conditioning and gauging parts of the cycle, the cam 86 releases the rod 85 so that the spring 84 yieldingly holds the drive roller 80 against the article.

Fig. 4 shows the position to which the article is advanced in the gauging station by the action of the push bar 29. In this position the forward end of the article engages the spring pressed finger 90 which overcomes the momentum of the article, the other end of the article projecting sufficiently from the gauging station to be engaged and driven by the rollers 78, 79 and 80. While in the gauging head the diameter of the article is gauged at two different points and for this purpose the gauging head is provided near each end with a series of radially spaced gauging nozzles 91 connected to a common source of air under pressure and to a common pressure responsive gauging device that is responsive to the amount of leakage taking place between the ends of the gauging nozzles and the outer surface of the workpiece. Each of these series of gauging nozzles is adapted to control a pair of switches responsive to oversize and undersize conditions, for example as disclosed in the prior application of Aller, Serial No. 660,902, filed April 10, 1946, now Patent No. 2,465,002.

The central portion of the workpiece is gauged for roundness and as shown in Figs. 4 and 5, the gauging head is provided with three radially spaced gauging nozzles 91, 92 and 93, all connected to an annular chamber 94 which communicates through a passage 95 with a pressure responsive tube 96 so that as air under constant pressure is applied from a regulated source and through a suitable restriction in the supply line to the chamber 94, the amount of leakage taking place through the nozzles will determine the pressure in the curved pressure responsive tube 96 to control a movable arm 98 having a bifurcated end in which are adjustable screws 99 and 100. The screw 100 is insulated from arm 98 and the other screw 99 is electrically connected to the arm. Between the spaced screws is a contact arm 101, pivotably mounted on shaft 102 and frictionally held on the shaft so that it may be pushed by one or the other of the screws 99, 100 but maintains its position when neither screw applies a moving force to it.

After the article is supplied to the gauging station, the drive wheel 80 is brought into engagement with the article to rotate it about 120 degrees to condition the out-of-round gauge in accordance with the extreme maximum or minimum radial dimension of the article. During this preliminary movement of the article in the embodiment of the invention shown, the arm 98 is first moved to the left to a position determined by the diameter of the article which determines the pressure applied to the tube 96. The arm 98 by screw 100 thus conditions arm 101 in accordance with the largest diameter, and will then remain stationary if the article is practically round but if an out-of-round condition exists, and depending upon its degree, the arm 98 will move back after conditioning the arm 101, as the article is rotated and automatically contact the arm 101 if the out of roundness is such as to cause a sufficient pressure decrease when the points of minimum radius are at the gauging nozzles. If the minimum radius is close enough to the maximum radius to fall within the tolerance requirements then when the arm 98 moves to the right during gauging after the conditioning action and during the continued rotation of the article, the screw 99 will not contact the arm 101 and the circuit will not be completed. During the initial rotation through 120 degrees, it will thus be understood that the out-of-round gauge is automatically conditioned; then the limit switch that initiates the gauging cycle is closed, as will be presently described, and during the next 120 degrees rotation of the workpiece a selecting or segregating relay will be closed or remain unenergized depending upon whether or not there is sufficient out of roundness present in the workpiece to fall outside the tolerance requirements determined by the space setting of the screw 99 with respect to the screw 100. In accordance with the present invention the conditioning of the contact 101 takes place before the actual gauging and selecting part of the cycle and it is immaterial whether the article is presented to the gauging station with its maximum or minimum radius opposite the out-of-round gauging nozzles. In the particular arrangement of three out-of-round gauging nozzles arranged 120 degrees apart an out of roundness of cloverleaf form is detected but it will be obvious that the number and angular displacement of these nozzles may be so chosen as to detect out of roundness of oval or other shapes.

Reference is now made to the various electrical connections as shown in Fig. 11, in which the switch controlling coils or relays are designated by numbers and the switches they control are designated by the same reference numeral followed by a suffix letter. In this figure the parts are shown in their normally deenergized position. Current is supplied from a suitable source through the power switch 104 to a transformer 105 to energize the leads 106 and 107. The power switch 104 is also connected through switches 108a to the motor 18, switches 108a being normally open but closed when relay coil 108 is energized by closing the start switch 109. Stop switch 110 is normally closed and can be operated to stop operations at any time. When the relay 108 is energized it closes a holding switch 108b across the starting switch so that the starting switch need be closed only temporarily. Manually operable switches 111 and 112 are closed by the operator, these switches being provided for setup purposes and remaining closed for automatic operation.

The motor being in operation, a piston pin is supplied to the gauging station by the push bar and during the retracting movements of the bar the cam operated switch 66 which is normally closed and the cam operated switch 65 which is normally open remain in their normal positions as shown in Fig. 11 and this condition continues until the workpiece in the gauging station is rotated about 120 degrees and produces the conditioning action of the out-of-round gauging device. This conditioning action having been completed, the apparatus is ready for an actual gauging operation and at this time the cam 64 opens the switch 66 and shortly thereafter cam 63 closes the switch 65. When the switch 66 opens, a relay winding 114 is deenergized thus opening a switch 114b of a holding circuit that maintains the settings of the selection circuits as will be further described. When the switch 65 is closed, relay winding 115 is energized to close switches 115a, 115b, 115c, 115d and 115e provided in gauging circuits for gauging the two diameters near the two ends of the article and the out of roundness at the middle portion of the article. If the number one diameter is within tolerance requirements the pressure controlled switches 118 and 119 will both be closed and current will flow through closed switches 115a and 115b and energize relays 120 and 121 which will close hold switches 120a and 121a connected through the main hold switch 114b to line 106. These relays also open switches 120b and 121b to deenergize signal lamps 141 and 140. They also open switches 120c and 121c and close switch 121d. In a similar manner the pressure controlled pair of gauging switches 123 and 124 control relays 125 and 126, relay 125 controlling switches 125a, 125b, 125c and 125d, while relay 126 controls switches 126a and 126b and 126c.

In this figure the switch 128 represents the switch provided by the contacts 99 and 101 automatically controlled by the out of roundness of the workpiece and this switch closes temporarily during the gauging cycle, after having been conditioned as previously explained, if the out of roundness is excessive. As soon as this gauge closes, current flows from one side of the line 106 through the switch 115e which is closed during the actual gauging operation by energization of the relay 115, relay winding 130 which promptly closes switch 130a to complete a holding circuit from the line side 107 through relay 130, closed switch 130a and to a lead wire 131 which is connected to the line side 106 through closed hold switch 114b. Relay winding 130 also closes a switch 130b to complete a circuit through relay 132 which closes a switch 132a and opens switch 132b. The opened switch 132b prevents current from flowing through the relay 133 of a salvage selection circuit and since the relay 133 is not energized the switch 133a it controls will remain open and no current will flow through the solenoid 44 which operates the stop 40 in order to arrest the motion of the articles on the conveyor and hold them opposite the guide trough 49. Those articles which are too much out of round will not be placed in the salvage selection group. On the contrary, they will be segregated in the reject trough 48 because the stop 39 will be moved down under the control of the solenoid 43, energized by closing a switch 134a due to the energization of relay 134 energized because the switch 132a is closed, a circuit being completed through the closed switch 132a and closed switches 114a and 112 back to the line side 106. The parts even though perfectly round will also be segregated in the reject trough 48 if either of the switches 125c or 121c is closed as will occur if either of the two diameters gauged is too small, for under these conditions the switch 118 or the switch 123 will not close and the relay 121 or 125 will not be energized.

The relay winding 133 will be energized to close the switch 133a and energize solenoid 44 to stop the article opposite the salvage trough 49 only if the out of roundness is within tolerance and one or the other of the diameters is too large. If the diameter is too large one or the other of the switches 119 or 124 will be opened to deenergize the relay 120 or 126 so that one or both of the switches 120c and 126c will be closed. Switch 125d will be closed since current is flowing through the relay 125, switch 121d will be closed since current is flowing through relay 121, and switch 132b will remain closed as previously mentioned if the out of roundness is excessive, so that a circuit will be completed through relay 133 to line side 106 through closed switches 114a and 112.

If neither of the relay windings 134 and 133 are energized, as will be the case where the part is acceptable both as to diameter and out of roundness, then neither of the relay windings 43 and 44 will be energized and the part gauged will travel down until it reaches the stop 38 and be subsequently pushed off into the trough 50 and segregated with the other parts which meet the gauging test.

The function of the switches 121b, 120b, 125b and 126a is to control the current flow through lamps 140, 141, 142 and 143 respectively, for use in initially setting up the apparatus.

Having completed the gauging operation while the article is in the gauging head, and having completed the setting of the several relays and switches in accordance with the gauging results, the workpiece is pushed from the gauging station by the application of a new workpiece to the gauging station and is carried along by the conveyor belt 33 and pushed off in the proper place so as to be segregated in one or the other of the three troughs, and it is only after this occurs that the cam 64 temporarily opens the cam operated hold switch 66 to deenergize the winding 114 and open the various holding circuits that have maintained the gauge controlling relays in their predetermined positions. About the same time or promptly after the switch 66 closes again, the cam controlled gauging switch 65 closes to start gauging another article. While the switch 65 is open and just before the gauging operation is actually started by closing this switch the article supplied to the gauging station is being rotated in its own axis to condition the setting of the contact 101 of the out-of-round gauge.

The apparatus has been described as adapted for segregation of the parts in accordance with diameters at two different locations and in accordance with out of roundness at the central portion of the article, and for segregation into one group of those parts that are over-size and thus salvageable if they satisfy the roundness condition, although the apparatus may be constructed to provide other groupings and selections as desired. The apparatus is capable of very rapidly handling articles supplied to it and in view of the simplicity of the construction and operation of the feeding and gauging mechanism, there is assurance that one article and one article only will be supplied for each cycle of gauging operations. It will also be obvious that the out of round check will be accurately carried out in an automatic manner and with great rapidity.

While the apparatus as herein described constitutes a preferred embodiment of the invention, it is therefore to be understood that the invention is not limited to the precise form described, in that changes may be made therein without departing from the scope of the invention which is defined in the appended claims.

What is claimed is:

1. Gauging apparatus comprising a gauging head for rotatably receiving an article, means for rotating the article about its own axis while in the gauging head, a gauging circuit, an out-of-round gauging means operatively connected to the gauging head and including an operable gauging member movable in accordance with the instantaneous changes in a radial dimension of the article during its rotation and controlling said gauging circuit, enabling means automatically operable after a predetermined rotation of the article for rendering said gauging circuit effective, said out-of-round gauging means including a presetting means comprising a pair of cooperating switch contacts operably connected in said gauging circuit, means supporting one of said switch contacts for positioning by the other, an operative connection between the presetting means and said operable gauging member to move one of said switch contacts in one direction only during said predetermined rotation for positioning the other switch contact and automatically presetting said gauging means in accordance with an extreme of the various radial dimensions of the article, and a timing connection between the rotating means and the enabling means.

2. Gauging apparatus comprising a gauging head, means for supplying an article to be gauged to the gauging head, means for rotating the article while in the gauging head, a gauging circuit, an out-of-round gauging means associated with the gauging head and including an operable gauging member movable in accordance with the instantaneous measurement of a radial dimension of the article during the rotation of the article and also including switch means under the control of said gauging member, said gauging means controlling said gauging circuit, enabling means for rendering said gauging circuit effective, means having a timed connection to said rotating means for automatically operating said enabling means after some rotation of the article has taken place, and conditioning means operable during said rotation of the article for automatically conditioning the switch means of said gauging means in accordance with the maximum instantaneous radial dimensions of the article, said conditioning means comprising a frictionally carried contact element and a second contact element for adjusting the first contact element in accordance with the maximum instantaneous radial dimension of the article.

3. Gauging apparatus comprising a gauging head for receiving an article to be gauged, means for rotating the article about a stationary axis while in the gauging head, a gauging circuit, an out-of-round gauging means operable connected to the gauging head for controlling said gauging circuit, said gauging means including a member movable in accordance with the instantaneous change in a radial dimension of the article during its rotation, enabling means for rendering said gauging circuit effective, means having a timed connection to said rotating means for automatically operating said enabling means after a predetermined rotation of the article, said out-of-round gauging means including a presetting means operable during said predetermined rotation of the article into a setting position and comprising an adjustable switch contact operably connected in said gauging circuit and controllably associated with said member for positioning thereby and automatically presetting said gauging means for each gauging operation in accordance with an extreme radial measurement of the article.

4. Gauging apparatus comprising a gauging head having an axial passage for rotatably receiving articles of generally cylindrical form, means for rotating the article about its axis while in the gauging head, means for supplying articles one at a time to said passage, a gauging circuit, an out-of-round gauging means operably connected to the gauging head and including an operable gauging member movable in accordance with the instantaneous changes in a radial dimension of the article during its rotation and a gauging switch controlled by said gauging member and controlling said gauging circuit, enabling means automatically operable after some preliminary rotation of the article for rendering said gauging circuit effective, a timing connection between the rotating means and the enabling means, said out-of-round gauging means including a presetting means operable by said gauging member during said preliminary rotation for automatically presetting said gauging means in accordance with the maximum radial dimension of the article, said presetting means comprising a movable switch element in said gauging circuit operable in one direction only by said gauging member, and a friction support for said element to retain the element frictionally in a position to which it is adjusted by the gauging member.

5. Gauging apparatus comprising a gauging head, power operated means for supplying articles to be gauged to the gauging head, means for rotating the article about its own axis while in the gauging head, means having a timed connection with the supplying means for initiating the rotation of the article, a gauging circuit, an out-of-round gauging means operatively connected to the gauging head for controlling said gauging circuit, enabling means having a timed connection with the supplying means and operable in timed relation with the supplying means after predetermined amount of rotation of the article for rendering said gauging circuit effective, and a presetting means forming a part of the out-of-round gauging means and including a pair of cooperating switch contacts operably connected in said gauging circuit, one of which is frictionally supported for adjustment by the other, said presetting means operating under control of the article into a setting position during said predetermined rotation of the article for automatically positioning the adjustable switch contact for each gauging operation in accordance with an extreme radial measurement of the article.

6. Gauging apparatus comprising a gauging head having an axial passage through which articles to be gauged may be axially passed, means for supplying articles to said gauging head, drive means for rotating an article about its own axis while in the gauging head, means for removing articles passed from said gauging head, selecting means controlling the movement of the articles passing from the gauging head, a gauging circuit, an out-of-round gauging means operatively connected to the gauging head for controlling said gauging circuit, said gauging means including an operable gauging member movable in accordance with the instantaneous change in a radial dimension of the article during its rotation, said gauging circuit controlling said selecting means, enabling means for rendering said gauging circuit effective, timing means automatically operable after a predetermined amount of rotation of the article while in the gauging head for operating said enabling means, said out-of-round gauging means further including a presetting means operable during said predetermined rotation of the article and including a friction supported switch element in said gauging circuit adjustably positioned by said gauging member for automatically presetting said gauging means in accordance with an extreme of the instantaneous radial dimensions of the article gauged during its rotation, and timing means for synchronizing the operation of the supplying means and the drive means.

7. Gauging apparatus comprising a gauging head for receiving an article to be gauged, means for rotating the article about a stationary axis while in the gauging head, a gauging circuit, an out-of-round gauging means operatively connected to the gauging head for controlling said gauging circuit, enabling means for rendering said gauging circuit effective, means having a timed connection to said rotating means for automatically operating said enabling means after a predetermined rotation of the article, and a presetting means forming a part of the out-of-round gauging means and including an adjustable switch contact operatively connected in said gauging circuit, and operating under control of the article into a setting position during said predetermined rotation of the article for automatically positioning the adjustable switch contact for each gauging operation in accordance with an extreme radial measurement of the article.

8. Gauging apparatus comprising a gauging head having an axial passage through which articles of generally cylindrical form may be passed, means for supplying articles to said gauging head, means for rotating an article about its own axis while in the gauging head, means for removing articles passed from said gauging head, selecting means controlling the movement of the articles passing from the gauging head, a gauging circuit, an out-of-round gauging means operatively connected to the gauging head and a diameter gauging means associated with the gauging head for controlling said gauging circuit and selecting circuits, enabling means having a timed connection with said rotating means and automatically operable after some preliminary rotation of the article while in the gauging head for rendering said gauging circuit effective, and said out-of-round gauging means including a presetting means operable during said preliminary rotation of the article comprising a switch contact operably connected in said gauging circuit operable in response to instantaneous changes in article diameter during the predetermined rotation of the article and a frictionally supported switch contact also operably connected in said gauging circuit cooperating therewith for automatically presetting said gauging means in accordance with the maximum instantaneous radial dimension of the article gauged during its rotation.

WILLIS FAY ALLER.

References Cited in the file of this patent

UNITED STATES PATENTS

| Number | Name | Date |
|---|---|---|
| 1,586,155 | Keller | May 25, 1926 |
| 1,726,657 | Ekvall | Sept. 3, 1929 |
| 1,818,968 | Anderson | Aug. 18, 1931 |
| 1,891,195 | Titus | Dec. 13, 1932 |
| 2,331,987 | Leatherman | Oct. 19, 1943 |
| 2,352,091 | Federchak et al. | June 20, 1944 |
| 2,353,184 | Nordquist | July 11, 1944 |
| 2,368,796 | Ardell | Feb. 6, 1945 |
| 2,426,751 | Rockstroh | Sept. 2, 1947 |
| 2,421,484 | Diamond | June 3, 1947 |
| 2,465,002 | Aller | Mar. 22, 1949 |
| 2,495,891 | Davis | Jan. 31, 1950 |